UNITED STATES PATENT OFFICE.

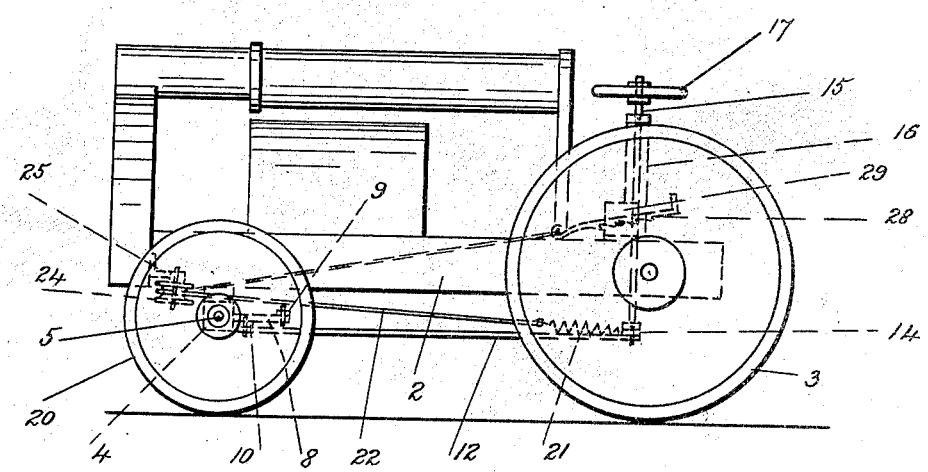
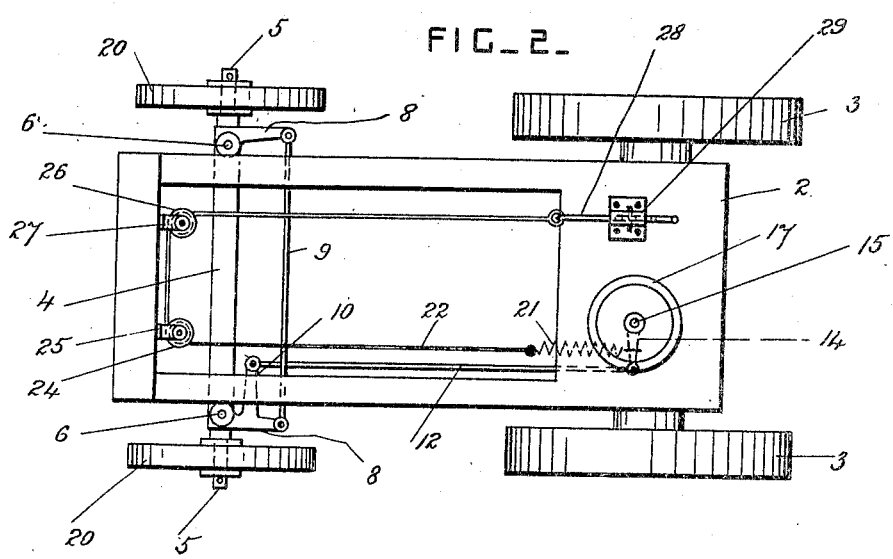

FORD M. HURNI, OF ST. JOE, INDIANA.

STEERING ATTACHMENT FOR TRACTORS.

1,341,426.

Specification of Letters Patent.   Patented May 25, 1920.

Application filed October 30, 1919.   Serial No. 334,448.

*To all whom it may concern:*

Be it known that I, FORD M. HURNI, a citizen of the United States, residing at St. Joe, in the county of Dekalb and State of Indiana, have invented certain new and useful Improvements in Steering Attachments for Tractors, of which the following is a specification.

This invention relates to the steering mechanism provided in connection with tractors used in plowing; and it consists in the novel construction and combination of the parts hereinafter fully described and claimed whereby one of the steering ground wheels of the tractor is automatically held in engagement with one side of the furrow previously formed by the plow and in which it runs.

In the drawings, Figure 1 is a side view showing an outline of a tractor provided with a steering attachment according to this invention. Fig. 2 is a plan view showing the attachment and some essential parts of the tractor.

The tractor is of any approved construction, and it is provided with a frame 2, and main ground wheels 3 which are revolved by any suitable motor. The front axle 4 has axle spindles 5 pivoted to its end portions by pins 6 and provided with rearwardly projecting arms 8, which are connected together by a coupling rod 9. One of the arms 8 has a laterally projecting arm 10, and 12 is a connecting-rod which couples the arm 10 pivotally with an arm 14 secured on the bottom of the steering shaft 15. The steering shaft 15 is journaled in a steering post 16 secured to the rear part of the frame and at one side thereof, and a steering hand wheel 17 is secured on the upper end portion of the steering shaft. All of these parts are of any approved construction.

The ground steering wheels 20 are mounted on the axle spindles 5, and in plowing it is generally desirable to hold the inner side of the right hand ground wheel against the side of the furrow previously cut, and in which it runs, while the other ground wheel runs on the unplowed land. This is generally done by means of the steering hand wheel 17, but in order to relieve the operator of the necessity of keeping hold of this hand wheel, all the time, the attachment hereinafter described is provided.

A helical coiled spring 21 is detachably connected at one end to the arm 14 on the bottom of the steering shaft, and a flexible connection 22, such as a cord, wire or chain, is attached to the end of the spring and is led over a guide sheave 24 mounted on a suitable support 25 on the front part of the frame 2, thence across the frame, over a similar guide sheave 26 secured to a support 27 at the other side of the frame at its front portion, and thence rearwardly to a point convenient to the operator, but on the other side of the frame from the steering hand wheel.

A toothed adjusting bar 28 is secured to the free end portion of the flexible connection and engages with a detent on a bracket 29 secured to the frame. This toothed bar is adjusted by hand to place the spring 21 under any desired tension, and thereby hold the steering mechanism in a position which presses one steering ground wheel against the side of the furrow in which it runs, and enables the operator to have a more free use of his hands.

The supports 25 and 27 may be portions of the tractor, or separate supports may be used. The location of the toothed bar 28 on the other side of the tractor from the steering hand wheel prevents it from being in the way of the operator, but places it in a position in which it is readily accessible. The spring can be disengaged when the tractor is not used for plowing.

What I claim is:

1. The combination, with a tractor provided with steering ground wheels, a steering shaft provided with an arm, and means for connecting the said arm operatively with the ground wheels; of a tension adjusting device arranged to one side of the steering shaft, a looped flexible connection provided with a spring and extending between the said arm and the tension adjusting device, and means for slidably supporting the middle and looped portion of the flexible connection.

2. The combination, with a tractor provided with steering ground wheels, a steering shaft provided with an arm, and means for connecting the said arm operatively with the ground wheels; of a spring secured to the said arm, a flexible connection secured to the spring, an adjusting device secured to the flexible connection, a support for the adjusting device arranged on the other side of the tractor from the steering shaft, and guide sheaves at the front end portion of the tractor for supporting the intermediate portions of the said flexible connection.

In testimony whereof I have affixed my signature.

FORD M. HURNI.